Oct. 22, 1935.  F. J. MUENCH ET AL  2,018,082
APPARATUS FOR BLENDING MATERIALS
Filed July 23, 1932   3 Sheets-Sheet 3

INVENTOR
Frank J. and John L. Muench.
BY
Robert J. Hulsizer
ATTORNEY

Patented Oct. 22, 1935

2,018,082

UNITED STATES PATENT OFFICE 2,018,082

APPARATUS FOR BLENDING MATERIALS

Frank J. Muench, Newark, and John L. Muench, Short Hills, N. J., assignors to General Machine Company, Newark, N. J.

Application July 23, 1932, Serial No. 624,166

7 Claims. (Cl. 259—81)

This invention relates to machines for mixing materials and has especial reference to blending successive batches of dry material such as paints, pigments, metallic oxides, flour, cosmetics, etc.

An object of the invention is to permit the mixer to be filled, operated, and discharged in a minimum of time.

A further object is to permit the entire operation to be as dust proof as possible.

A still further object is to prevent fire in the mixer.

A yet further object is to permit the mixer to be easily operated in all its functions from the floor of the plant by one man in a minimum of time.

Further and more specific objects, features and advantages will more clearly appear from a consideration of the specification hereinafter taken in connection with the accompanying drawings which form part of the specification and which illustrate a present preferred form of the invention.

The general construction of the apparatus includes a mixer of hollow double cone shape with relatively smooth interior. A water pipe extends slightly into the mixer axially through one journal and has a fusible plug in its end to permit water to get into the mixer at high temperatures.

A bin for ground batches is disposed above the mixer and has an opening to discharge into the mixer and a flexible sleeve connecting the opening with the opening in the mixer. The lower end of the sleeve is a metal collar adapted to fit the port of the mixer to prevent escape of material. This collar may be lowered into and raised from position by means of cables or ropes from the floor of the plant. The opening in the mixer is controlled by a slide gate with a rack and pinion. The pinion is operated by a hand wheel and a cable or chain extends from this wheel to the opposite end of the mixer to permit the gate to be operated in either up or down position of the gate opening.

A dust collecting apparatus may be connected to a suitable pipe in the mixer when the mixer is in discharge position so as to prevent escape of dust. A canvas sleeve extends from the discharge opening to and over a barrel receiving the material after it has been thoroughly mixed. A novel hinged manhole is provided to conveniently clean and inspect the interior of the barrel.

In the drawings,—

Figure 1:
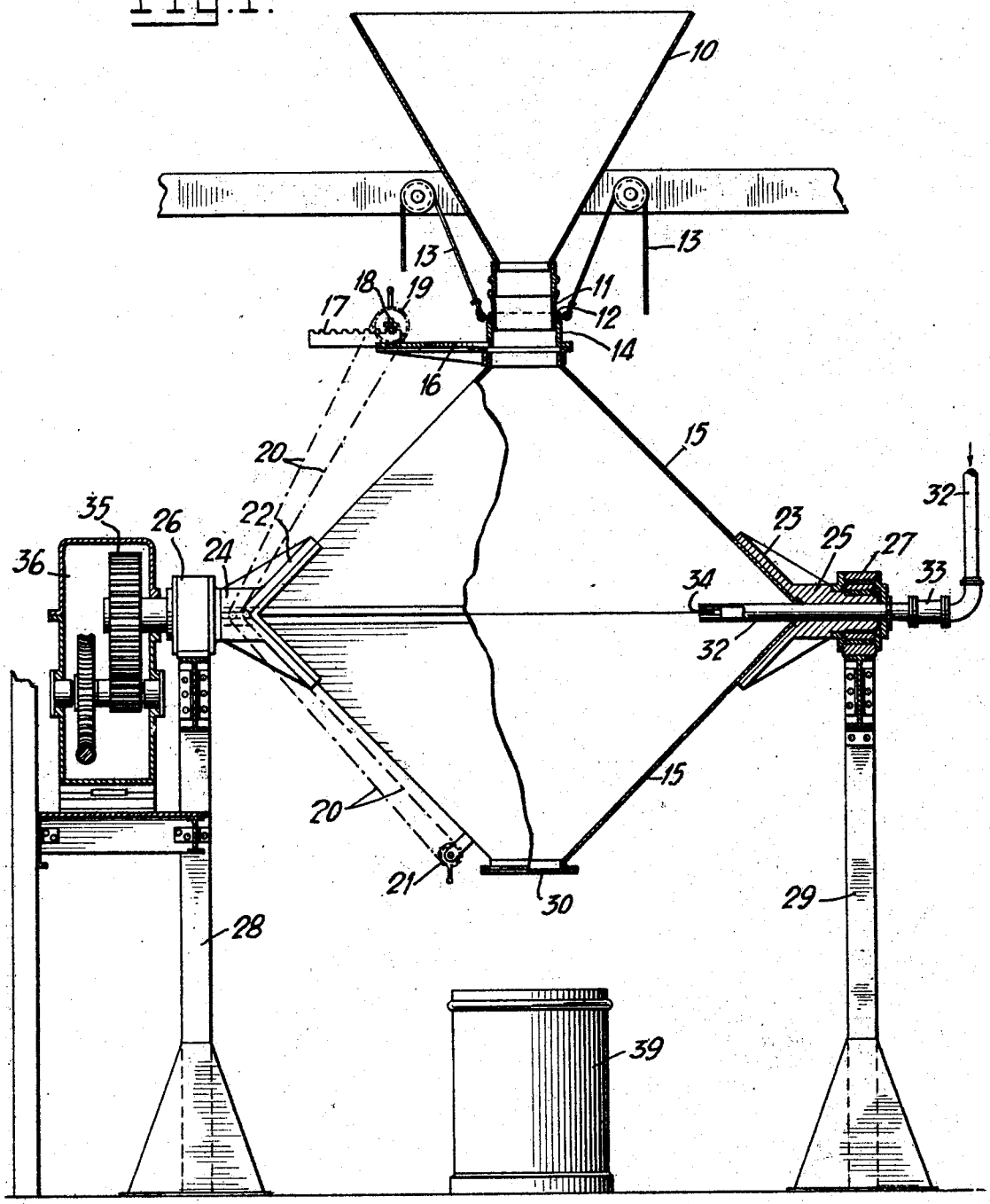
Fig. 1 is a sectional view of the device in charging position.

As shown in the drawings, the device includes a bin 10 on the floor above. A neck extends through the floor above the mixer and a flexible canvas sleeve 11 with a lower metal collar 12 can be lowered by means of ropes 13 from the floor of the plant by the man in charge of the unit. The collar 12 is designed and machined to fit into the filling opening 14 of the mixer 15 when lowered thereinto. The opening may be closed by a slide gate 16 actuated by rack 17 and pinion 18 through the hand wheel 19. A cable or chain 20 extends to opposite end of mixer 15 to another hand wheel 21 so that the operator may control the gate 16 when it is either above or below the mixer.

The mixer is of double cone shape substantially smooth inside to permit thorough and quick and efficient mixing and discharges itself and is easy to clean. It is supported to rotate around its axis at right angles to the conical axis. Castings 22 and 23 are welded or riveted to it and have bearings 24 and 25 housed in journals 26 and 27 on upper ends of pedestals 28 and 29. These pedestals may be based on the floor or hung from girders as desired. The opening described is at one apex of the double cone and a removable cover 30 is at the other apex. A manhole plate 31 also permits ready inspection and cleaning of the mixer.

Figure 2:
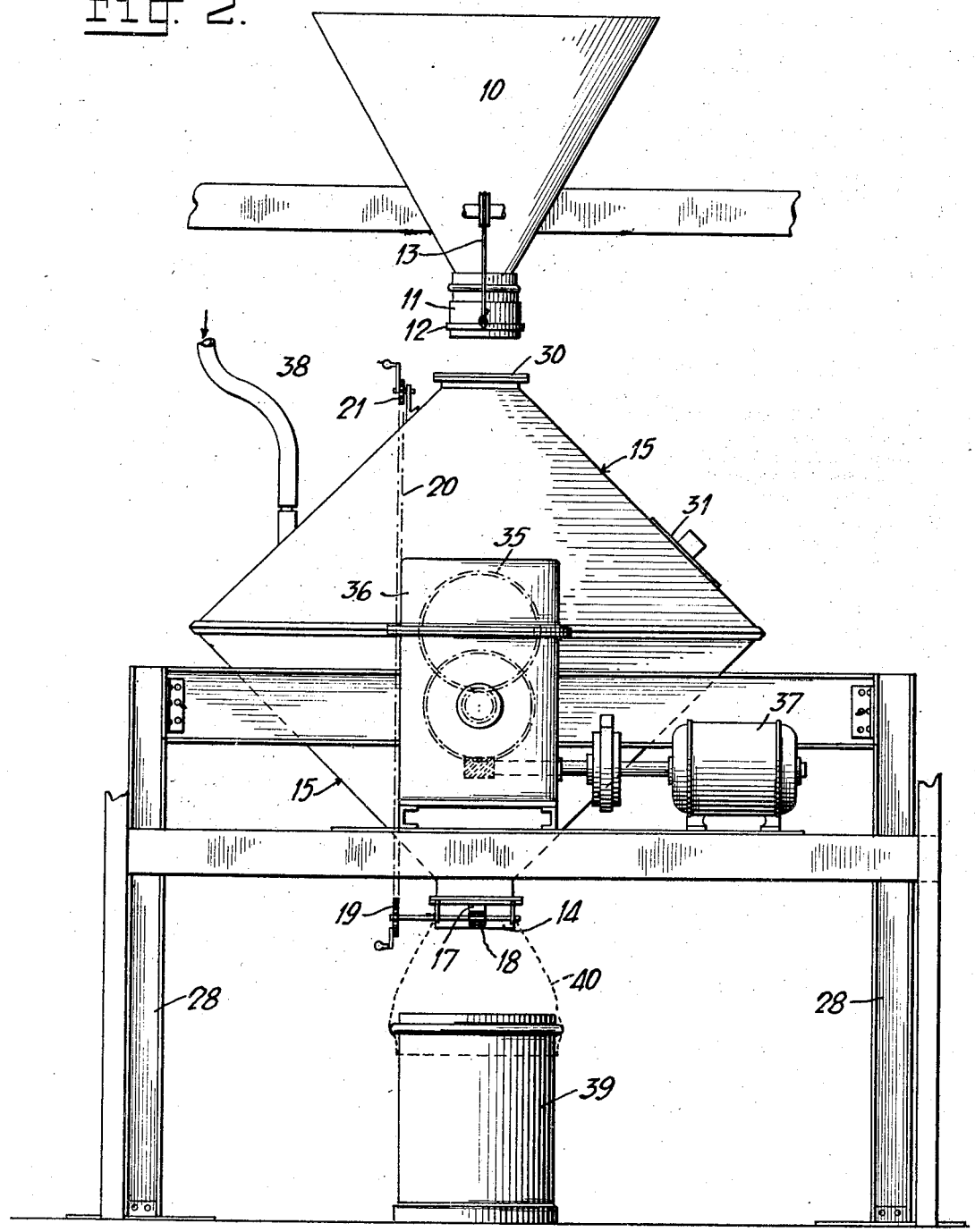
Fig. 2 is an elevation in discharge position.
Figure 3:
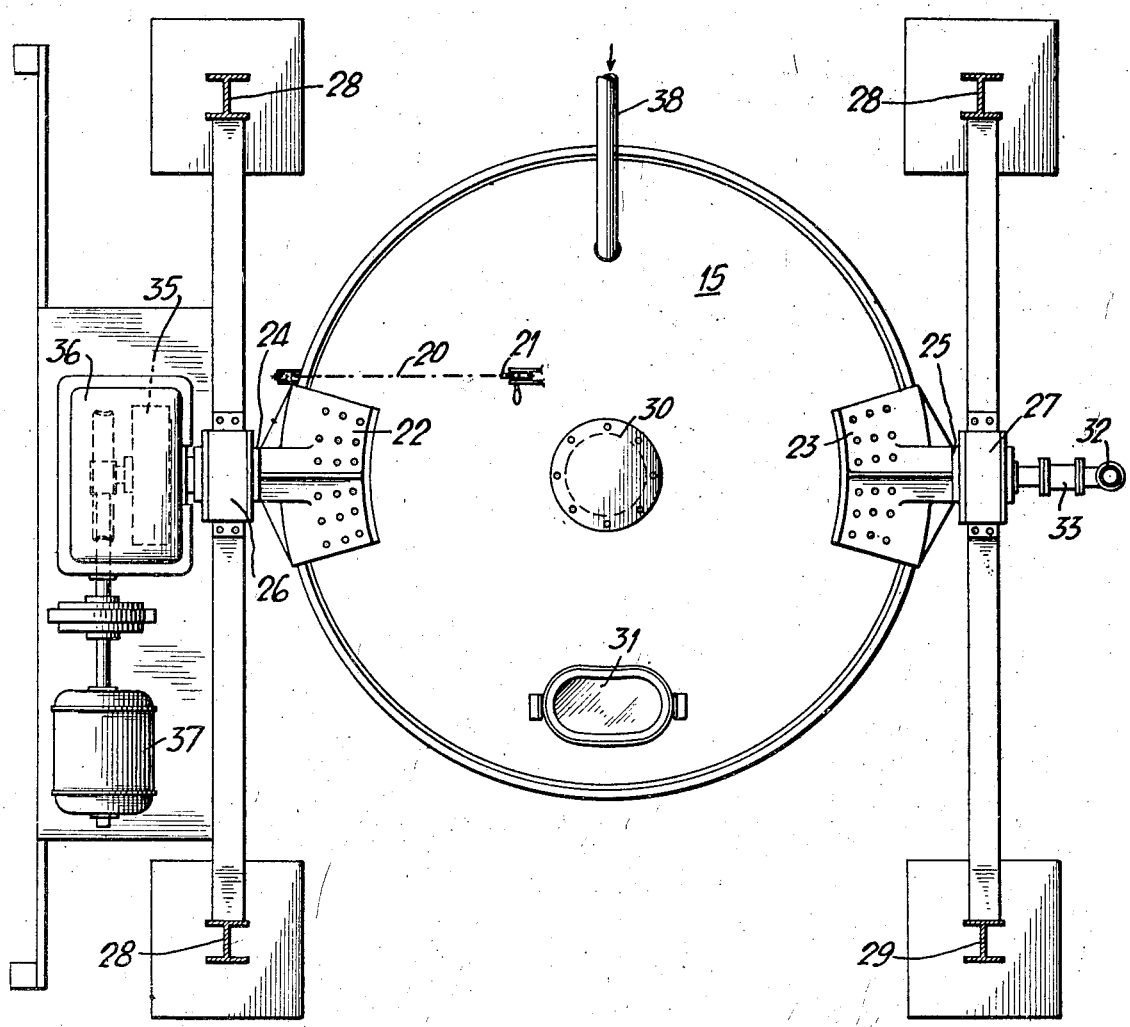
Fig. 3 is a plan view.

A pipe 32 extends partially into mixer 15 through bearing 25 and has a swivel joint at 33. A fusible plug 34 is disposed on the end of the pipe 32 to admit water to the mixer when the temperature gets too high. The opposite bearing 24 is connected to a drive pinion 35 forming part of a reduction gear unit 36 and driven by a motor 37. A pipe 38 leads from the mixer to a dust collecting apparatus when discharging as shown in Fig. 2. A barrel 39 is disposed below the mixer 15 and a canvas sleeve 40 connects it to the opening 14 when below to keep dust from escaping. The motor 37 may be controlled by any suitable electrical apparatus and regulated by button control to rotate the mixer in any direction continuously or to "inch" it step by step as desired.

In operation the mixer is "inched" to the position shown in Fig. 1 with the opening 14 below the neck of bin 10. The ropes 13 are operated to lower the collar 12 into the opening 14. Sleeve 11 prevents dust escaping as the contents of the bin 10 dump into the mixer 15. The gate 16 is then closed by turning the hand wheel 21 from the floor of the plant and the discharge nozzle 12 is raised. The mixer is then rotated for a suitable time when the blending is completed. Then it is stopped with the opening 14 over the barrel 39. Sleeve 40 is put into position and pipe 38 connected to a dust collecting apparatus. Then wheel 19 is operated to open gate 16 and the contents of the mixer dumped out into one or more barrels or containers in a quick and dust-proof manner.

If, for any reason, material in the mixer gets too hot the fusible plug 34 will melt permitting water or other extinguishable material into the mixer 15 from the pipe 32. After all the contents are out the mixer can be cleaned very easily and quickly by keeping the gate 16 open and by removing the cover 30 and the manhole plate 31. The substantially smooth interior makes this possible. Then the gate 16 is closed, the cover put on again, and the mixer moved to filling position and the operation repeated for a new batch.

The device is simple, efficient, practical, easy to operate by one man, and form part of a simple method above described.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In combination a hollow double cone mixer, means for rotating it around an axis at right angles to the conical axis, a bin for ground material above the mixer, a flexible connection adapted to be connected from the bin to an opening in the mixer, a slide gate in said opening, means to move the mixer so that the gate is disposed at the bottom thereof, and a separate flexible sleeve to connect the discharge opening with a barrel or other container to fill the same with mixed material.

2. In combination a hollow double cone mixer, means for rotating it around an axis at right angles to the conical axis, a bin for ground material above the mixer, a flexible connection adapted to be connected from the bin to an opening in the mixer, a slide gate in said opening, means to move the mixer so that the gate is disposed at the bottom thereof, and a separate flexible sleeve to connect the discharge opening with a barrel or other container to fill the same with mixed material, and means for applying suction to the mixer while discharging the material.

3. In a rotatable hollow double cone mixer disposed with its conical axis in a vertical plane, means to receive material through an opening from a bin above the mixer, means to rotate the mixer in a vertical plane, means to discharge the material in a dust-proof manner, means to spray the interior of the mixer with liquid if the interior gets too hot, means to apply suction to the mixer during discharge, and means to control a gate in the opening in either receiving or discharging position of the mixer.

4. A rotary mixer of double conical shape with its conical axis disposed for rotation in a vertical plane, a bin above it, an opening in the mixer, a flexible sleeve dependent from the bin, a shaped collar on the lower end of the sleeve and adapted to fit into the opening in the mixer, and means such as cables to raise and lower said collar from the floor on which the mixer stands.

5. A rotary mixer of double conical shape, having an opening at one apex, a slide gate controlling said opening, means to move said gate, and means to operate said gate-moving means from the opposite end of the mixer, and means for rotating said mixer with the conical axis in a vertical plane.

6. A rotary mixer of double conical shape with its conical axis disposed for rotation in a vertical plane, said mixer having an opening at one apex, a slide gate controlling said opening, a rack and pinion mechanism for moving said gate, a cable connected to said mechanism and extending to the opposite end of the mixer to permit the gate to be operated from that distant point.

7. A mixer of double conical shape disposed with its conical axis in a vertical plane for rotation in that plane, said mixer having an apex discharge opening, a flexible connection adapted to be extended from said opening to a receptacle to receive mixed material, and means for applying suction apparatus to the mixer while the material is being discharged so that dust will not escape.

FRANK J. MUENCH.
JOHN L. MUENCH.